United States Patent
Yen et al.

(10) Patent No.: US 9,410,599 B2
(45) Date of Patent: Aug. 9, 2016

(54) ROLL CONTROL DEVICE FOR A VEHICLE CURTAIN

(71) Applicant: MACAUTO INDUSTRIAL CO., LTD., Tainan City (TW)

(72) Inventors: Hung-Ming Yen, Tainan (TW); Paul Lin, Tainan (TW)

(73) Assignee: MACAUTO INDUSTRIAL CO., LTD., Tainan (TW)

( * ) Notice: Subject to any disclaimer, the term of this patent is extended or adjusted under 35 U.S.C. 154(b) by 39 days.

(21) Appl. No.: 14/586,953

(22) Filed: Dec. 30, 2014

(65) Prior Publication Data

US 2015/0211605 A1    Jul. 30, 2015

(30) Foreign Application Priority Data

Jan. 24, 2014 (TW) ............................ 103201603 U

(51) Int. Cl.
| | |
|---|---|
| *F16H 57/08* | (2006.01) |
| *F16H 1/28* | (2006.01) |
| *E06B 9/42* | (2006.01) |
| *E06B 9/68* | (2006.01) |
| *E06B 9/60* | (2006.01) |
| *E06B 9/80* | (2006.01) |
| *B60J 1/20* | (2006.01) |

(52) U.S. Cl.
CPC ............ *F16H 1/2863* (2013.01); *B60J 1/2033* (2013.01); *E06B 9/42* (2013.01); *E06B 9/60* (2013.01); *E06B 9/68* (2013.01); *E06B 9/80* (2013.01); *E06B 2009/807* (2013.01); *F16H 57/08* (2013.01); *F16H 57/082* (2013.01)

(58) Field of Classification Search
CPC ...... F16H 57/08; F16H 57/082; B60J 1/2033; E06B 9/60; E06B 9/80; E06B 9/68; E06B 9/42
USPC .......................................................... 475/331
See application file for complete search history.

(56) References Cited

U.S. PATENT DOCUMENTS 3,472,083 A * 10/1969 Schnepel ................ B25B 17/00
                                                      475/270
7,758,466 B2 * 7/2010 Kato .................... B60K 17/346
                                                      475/248

(Continued)

FOREIGN PATENT DOCUMENTS

JP    DE 10049564 A1 * 4/2001 ................ F16H 1/28

*Primary Examiner* — Roger Pang
(74) *Attorney, Agent, or Firm* — Rabin & Berdo, P.C.

(57) ABSTRACT

A roll control device for a vehicle curtain has a unidirectional transmission device and a damping assembly. The unidirectional transmission device has a gear base, multiple planet gears and a transmission wheel. The gear base has a connecting segment, a driving segment formed on a side of the connecting segment and an axle. The driving segment has multiple receiving recesses and multiple limiting segments. The planet gears are mounted rotatably and slidably in the receiving recesses respectively and are selectively limited by the limiting segments respectively to rotate with the gear base. The transmission wheel is rotatably combined with the gear base, encloses the planet gears and has a transmission gear. The damping assembly is connected with the unidirectional transmission device and has a driven gear and a damper. The driven gear engages the transmission gear on the transmission wheel. The damper is connected with the driven gear.

11 Claims, 7 Drawing Sheets

(56) References Cited

U.S. PATENT DOCUMENTS

| | | | |
|---|---|---|---|
| 9,249,876 B2* | 2/2016 | Yun | F16H 57/082 |
| 2003/0181283 A1* | 9/2003 | Chen | F16H 57/082 475/331 |
| 2003/0181284 A1* | 9/2003 | Chen | F16H 57/082 475/331 |
| 2009/0051187 A1* | 2/2009 | Biecker | B60R 5/047 296/37.16 |
| 2011/0272106 A1* | 11/2011 | Mullet | E06B 9/60 160/311 |
| 2015/0159746 A1* | 6/2015 | Volkmer | B60K 17/046 475/343 |

* cited by examiner

ROLL CONTROL DEVICE FOR A VEHICLE CURTAIN

BACKGROUND OF THE INVENTION

1. Field of the Invention

The present invention relates to a vehicle curtain, especially to a roll control device of a vehicle curtain.

2. Description of the Prior Art(s)

A conventional vehicle curtain comprises a hollow receiving housing, a curtain rod rotatably mounted in the receiving housing, a curtain fabric connected to the curtain rod, and a rolling device connected to an end of the curtain rod and having a torsion spring.

When the curtain fabric is drawn out of the receiving housing and expanded, the torsion spring of the rolling device is twisted and stores elastic potential energy. When the curtain fabric is retracting, the elastic potential energy of the torsion spring drives the curtain rod to roll backward to wrap the curtain fabric around the curtain rod. However, during retracting of the curtain fabric, once the curtain fabric is released and the curtain rod rolls freely to wrap the curtain fabric, the elastic potential energy is so large that the curtain rod vibrates excessively and causes noise.

To overcome the shortcomings, the present invention provides a roll control device of a vehicle curtain to mitigate or obviate the aforementioned problems.

SUMMARY OF THE INVENTION

The main objective of the present invention is to provide a roll control device for a vehicle curtain.

The roll control device has a unidirectional transmission device and a damping assembly. The unidirectional transmission device has a gear base, multiple planet gears and a transmission wheel. The gear base has a connecting segment, a driving segment formed on a side of the connecting segment and an axle. The driving segment has multiple receiving recesses and multiple limiting segments. The receiving recesses are formed in a periphery of the driving segment and arranged around a center of the gear base at even intervals. The limiting segments are defined respectively between the receiving recesses, and each limiting segment has a curved flange formed on an end of the limiting segment and being adjacent to a corresponding one of the receiving recesses. The axle is formed on and protrudes from the driving segment at a side opposite to the connecting segment. The planet gears are mounted rotatably and slidably in the receiving recesses respectively and are selectively limited by the curved flanges respectively to rotate with the gear base. Each planet gear has toothed segment and a gear axle. The transmission wheel is rotatably combined with the gear base, encloses the planet gears and has a wheel base, a transmission gear and a through hole. The wheel base has a toothed recess defined in a side of the wheel base and having a toothed inner surface selectively engaging the planet gears. The transmission gear is formed on the wheel base at a side opposite to the toothed recess. The through hole is defined through a center of the transmission gear and communicates with the toothed recess, and the axle of the gear base extends rotatably through the toothed recess and the through hole. The damping assembly is connected with the unidirectional transmission device and has a driven gear and a damper. The driven gear engages the transmission gear on the transmission wheel. The damper is connected with the driven gear.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
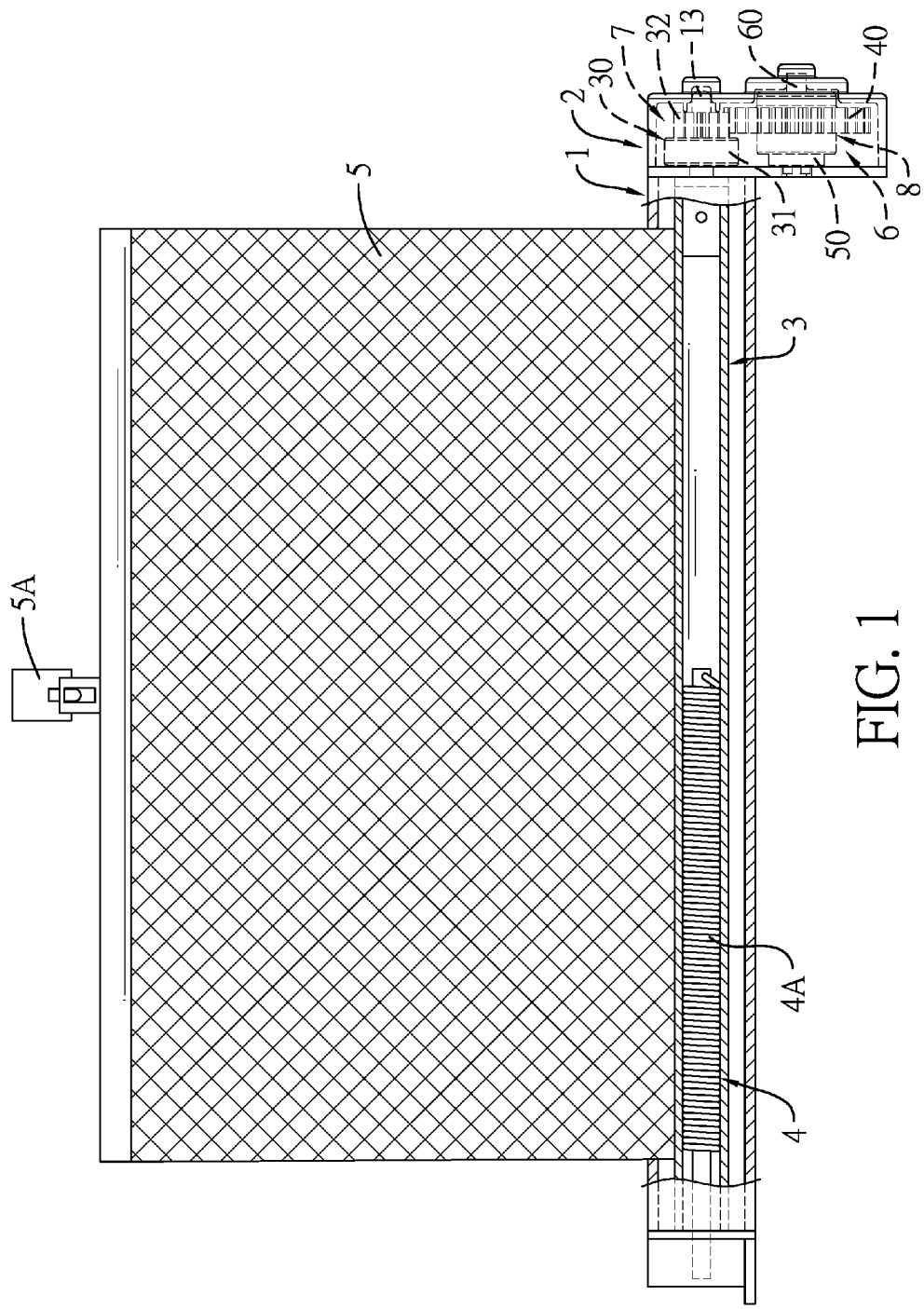
FIG. 1 is a side view in partial section of a roll control device in accordance with the present invention mounted on a vehicle curtain.

With reference to FIG. 1, a roll control device 6 in accordance with the present invention is mounted in a case 2 of a vehicle curtain. The vehicle curtain comprises a receiving housing 1, the case 2, a curtain rod 3, a curtain fabric 5 and a rolling device 4. The case 2 is mounted on one end of the receiving housing 1. The curtain rod 3 is rotatably mounted in the receiving housing 1. The curtain fabric 5 has an end connected with curtain rod 3, can be wrapped around the curtain rod 3 and can be expanded or retracted relative to the receiving housing 1. The rolling device 4 is connected with the curtain rod 3 at an end opposite to the case 2 and comprises a torsion spring 4A.

Figure 2:
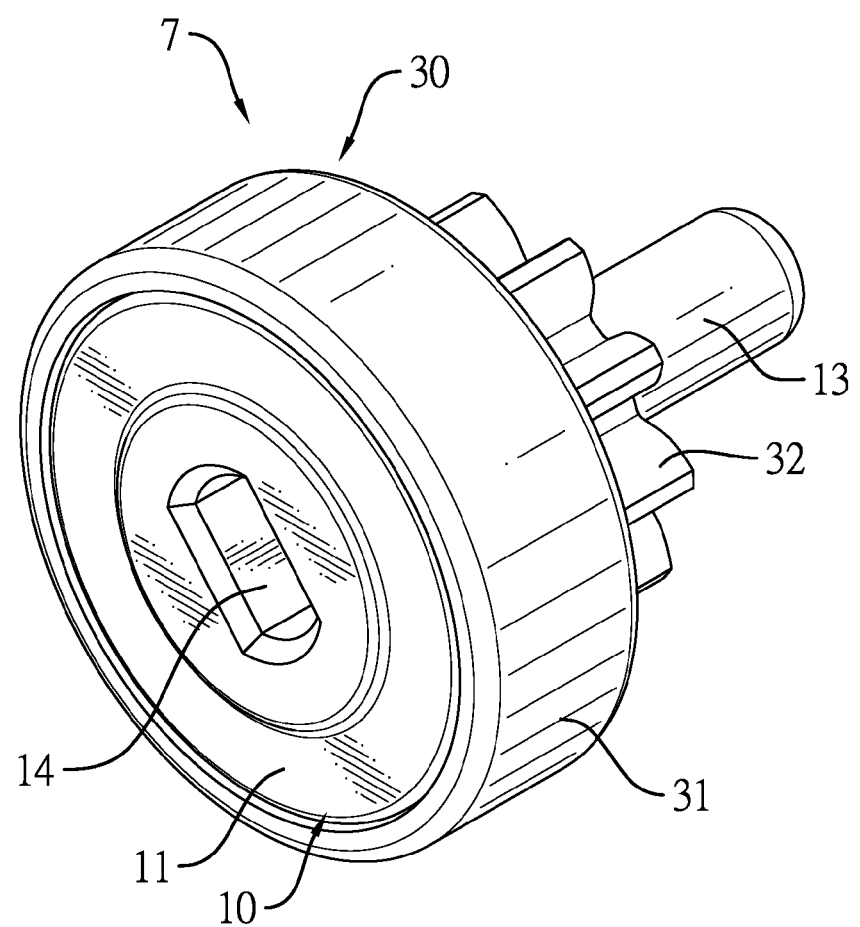
FIG. 2 is an enlarged perspective view of a unidirectional transmission device of the roll control device in FIG. 1.
Figure 3:
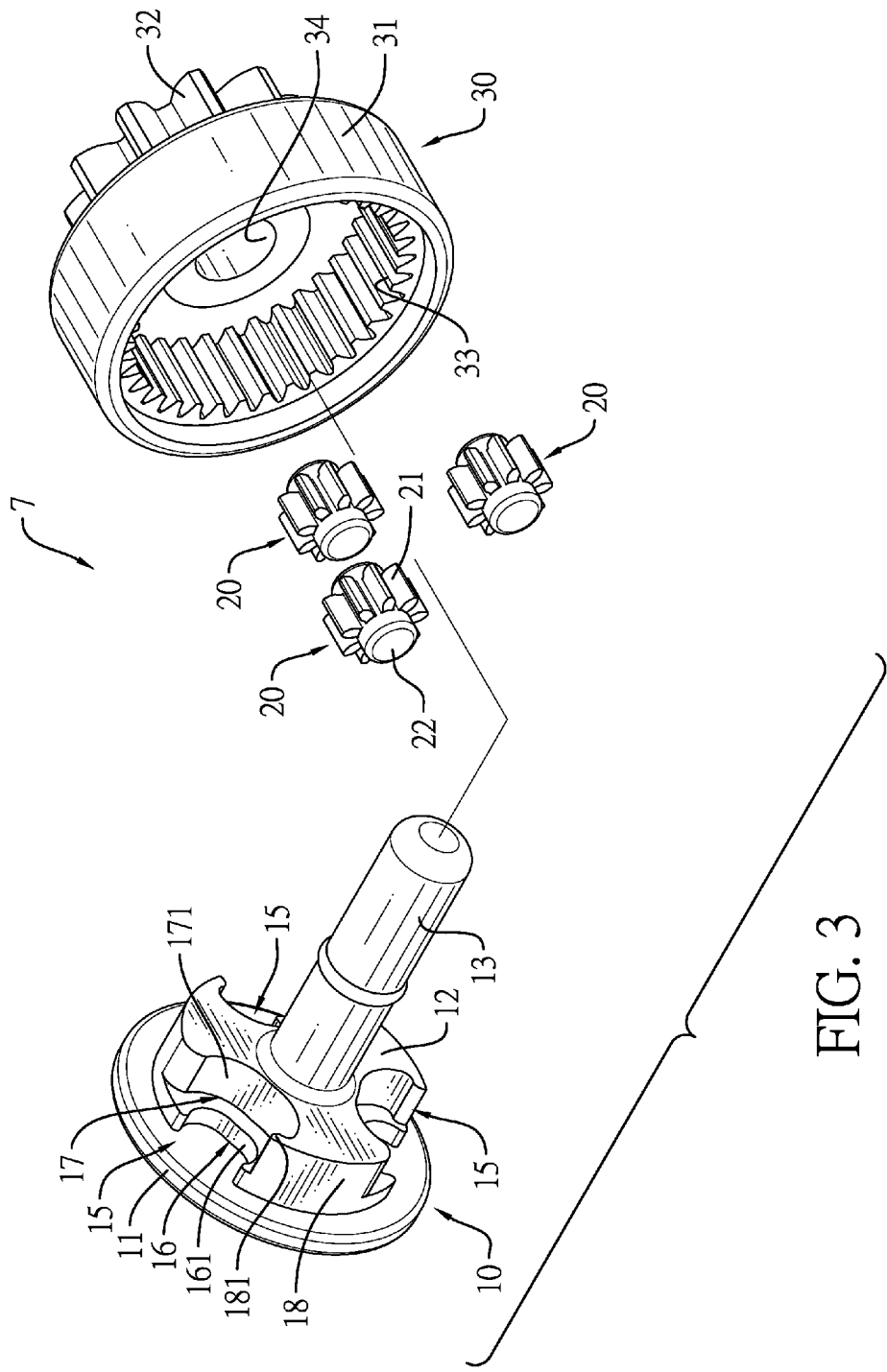
FIG. 3 is an exploded perspective view of the unidirectional transmission device in FIG. 2.

With reference to FIGS. 1 to 3, the roll control device 6 comprises a unidirectional transmission device 7 and a damping assembly 8.

The unidirectional transmission device 7 is mounted in the case 2 and comprises a gear base 10, multiple planet gears 20 and a transmission wheel 30. The gear base 10 comprises a connecting segment 11, a driving segment 12 and an axle 13. The driving segment 12 is formed on one side of the connecting segment 11. The axle 13 is formed on and protrudes from the driving segment 12 at a side opposite to the connecting segment 11. The connecting segment 11 has an engaging hole 14 formed in a side of the connecting segment 11 opposite to the driving segment 12 and engaging with an end of the curtain rod 3, such that the gear base 10 can be rotated with the curtain rod 3.

The driving segment 12 comprises multiple receiving recesses 15 formed in a periphery of the driving segment 12 and arranged around a center of the gear base 10 at even intervals. Multiple limiting segments 18 are defined respectively between the receiving recesses 15. Each receiving recess 15 is stepped and comprises a first holding segment 16 and a second holding segment 17. The second holding segment 17 has an inner diameter larger than that of the first holding segment 16, so the cross sectional area of the second holding segment 17 is larger than that of the first holding segment 16. The first holding segment 16 and the second holding segment 17 of each receiving recess 15 respectively have a curved inner surface 161,171. In addition, each limiting segment 18 has a curved flange 181 formed on one end of the limiting segment 18 and being adjacent to the second holding segment 17 of a corresponding receiving recess 15.

Figure 4:
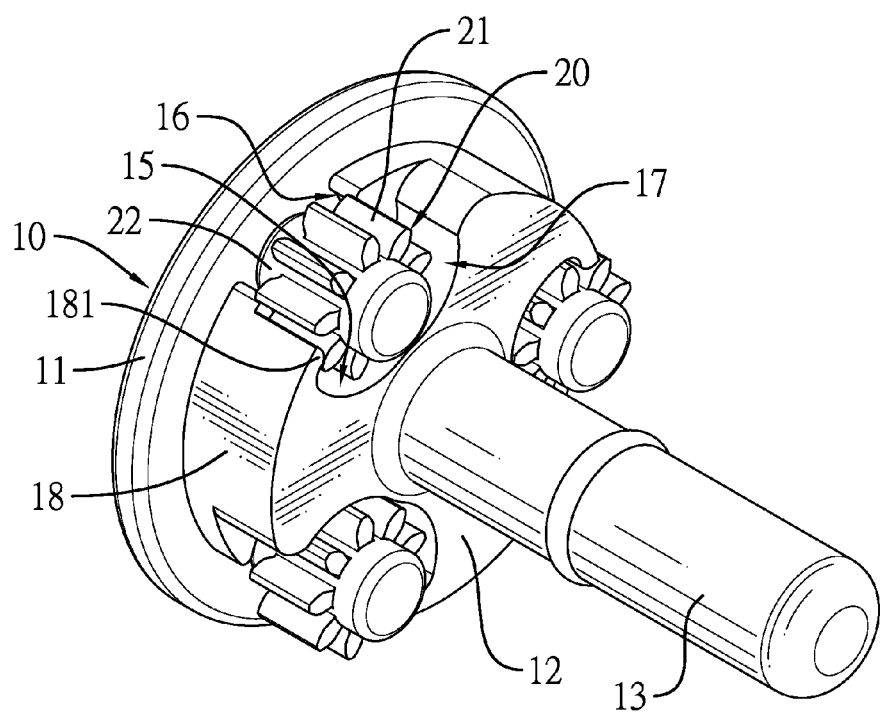
FIG. 4 is a perspective view of a gear base and planet gears of the unidirectional transmission device in FIG. 2.

With reference to FIGS. 2 to 4, the planet gears 20 are mounted on the gear base 10, are arranged around the axle 13 and are respectively mounted in the receiving recesses 15. Each planet gear 20 comprises a gear axle 21 and a toothed segment 22. The toothed segment 22 is mounted in the second holding segment 17 of a corresponding receiving recess 15, and one end of the gear axle 21 is mounted in the first holding recess 16 of the corresponding receiving recess 15. The toothed segment 22 has a diameter larger than that of the gear axle 21 but is smaller than the inner diameter of the corresponding second holding segment 17. The diameter of the gear axle 21 is smaller than the inner diameter of the corresponding first holding recess 16. Accordingly, the plant gears 20 are rotatable relative to the gear base 10 and are moveable relative to the receiving recesses 15.

The transmission wheel 30 is rotatably combined with the gear base 10, encloses the planet gears 20 and comprises a wheel base 31 and a transmission gear 32. The wheel base 31 has a toothed recess 33 defined in one side of the wheel base 31 and has a toothed inner surface. The toothed recess 33 has an opening in the side of the wheel base 31. The transmission gear 32 is formed on the wheel base 31 at a side opposite to the toothed recess 33. A through hole 34 is defined through a center of the transmission gear 32 and communicates with the toothed recess 33. The planet gears 20 selectively engage the toothed inner surface of the toothed recess 33. The axle 13 of the gear base 10 rotatably extends through the toothed recess 33 and the through hole 34 and protrudes out of the transmission wheel 30 to rotatably connect with the case 2.

With reference to FIGS. 3 and 4, the planet gears 20 are rotatably mounted in the receiving recesses 15. The gear axle 22 of each planet gear 20 slidably abuts with the curved inner surface 161 of the corresponding first holding segment 16. The toothed segment 21 of each planet gear 20 is kept from abut with the curved inner surface 171 of the corresponding second holding recess 17 to form a gap between the toothed segment 21 and the curved inner surface 171 of the corresponding second holding segment 17 so as to prevent the drag between toothed segment 21 and the curved inner surface 171, such that noise can be avoided.

With reference to FIG. 1, the damping assembly 8 is mounted in the case 2 and comprises a driven gear 40 and a damper 50. The driven gear 40 is rotatably mounted in the case 2 and engages with the transmission gear 32 on the transmission wheel 30. The damper 50 is mounted in the case 2 and is connected with the driven gear 40 to provide a damping effect and to the driven gear 40 and to slow down the rotating speed of the driven gear 40 and the transmission wheel 30. The damping assembly 8 further comprises a central axle 60 rotatably connected with the case 2, and the damper 50 is mounted around the central axle 60. Preferably, the driven gear 40 has a diameter larger than that of the transmission gear 32 on the transmission wheel 30, such that the rotating speed of the driven gear 40 is slower than that of the transmission gear 32.

Figure 5:
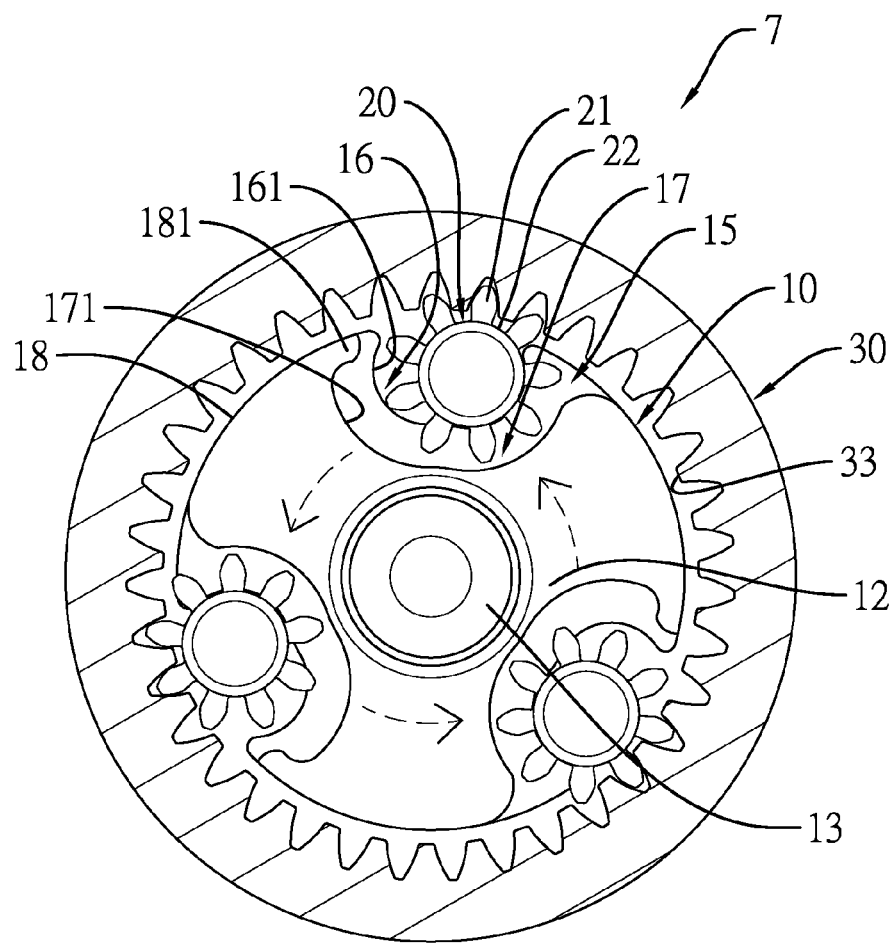
FIG. 5 is an operational side view in partial section of the unidirectional transmission device in FIG. 2 when the curtain fabric of the vehicle curtain is expanded.

With reference to FIGS. 1 and 5, when the curtain fabric 5 of the vehicle curtain is expanded from the receiving housing 1, the curtain rod 3 is rotated with the expansion of the curtain fabric 5. At this time, the gear base 10 is also rotated in a direction shown in FIG. 5 due to the engagement between the curtain rod 3 and the gear base 10. Consequently, the gear axles 22 of the planet gears 20 are respectively moved along the curved inner surfaces 161 of the first holding segments 16 to positions where are away from the curved flanges 181. Thus, the planet gears 20 are kept from being limited by the curved flanges 181 of the limiting segments 18, is free to engage the toothed inner surface of the toothed recess 33 and can rotate freely relative to the receiving recesses 15. Accordingly, the curtain fabric 5 can be expanded without drag and is hooked on a hook 5A to hold the curtain fabric 5 in a complete expansion position.

Figure 6:
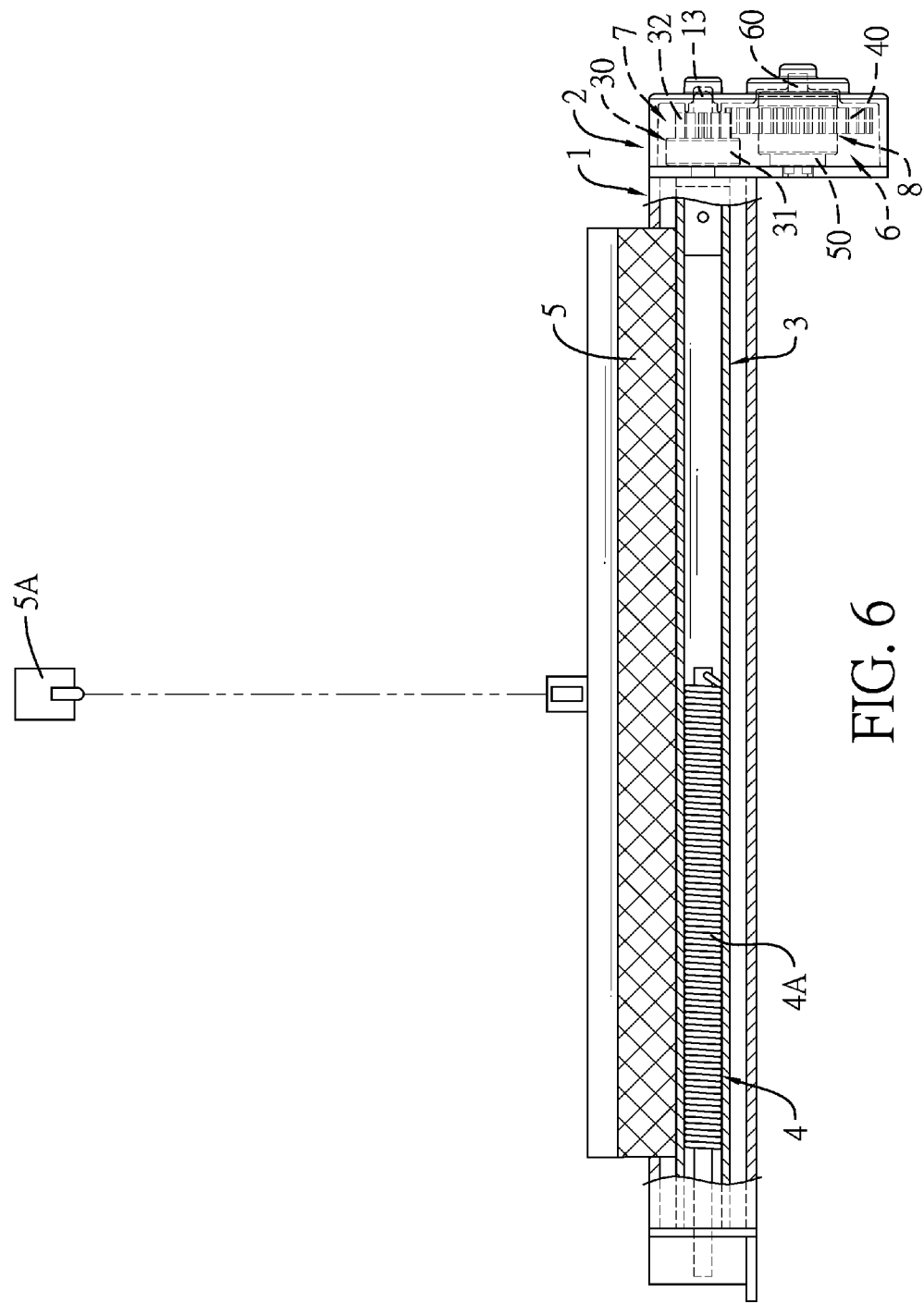
FIG. 6 is an operational side view in partial section of the vehicle curtain in FIG. 1.
Figure 7:
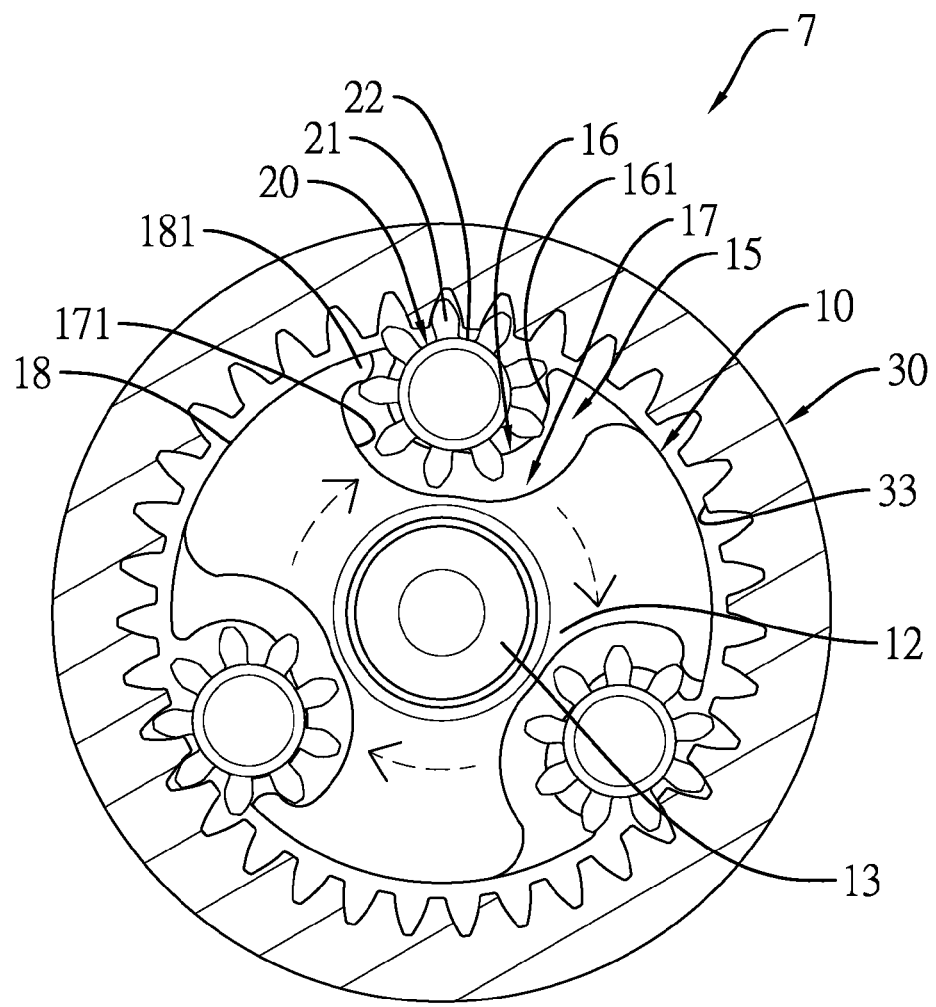
FIG. 7 is an operational side view in partial section of the unidirectional transmission device in FIG. 6 when the curtain fabric is retracted.

With reference to FIGS. 6 and 7, when the curtain fabric 5 is retracted into the receiving housing 1, the curtain rod 3 will be rotated in reverse by the rolling device 4. At this time, the gear base 10 is also rotated in the reverse direction as shown in FIG. 7. Consequently, the gear axles 22 of the planet gears 20 are respectively moved along the curved inner surfaces 161 of the first holding segments 16 to positions where are adjacent to the curved flanges 181. Thus, the planet gears 20 are limited by the curved flanges 181 of the limiting segments 18 and engage with toothed inner surface of the toothed recess 33 of the transmission wheel 30, such that the transmission wheel 30 is rotated by the gear base 10 and planet gears 20. Accordingly, driven gear 40 is rotated by the transmission gear 32 on the transmission wheel 30, and the damper 50 can provide a damping effect to curtain rod 3 with the transmission of the driven gear 40, the transmission wheel 30 and the gear base 10. Therefore, no noise and excessive vibration would occur when retracting the curtain fabric 5.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:
1. A roll control device for a vehicle curtain comprising:
   a unidirectional transmission device comprising
      a gear base having
         a connecting segment;
         a driving segment formed on a side of the connecting segment and having
            multiple receiving recesses formed in a periphery of the driving segment and arranged around a center of the gear base at even intervals; and
            multiple limiting segments defined respectively between the receiving recesses and each limiting segment having a curved flange formed on an end of the limiting segment and being adjacent to a corresponding one of the receiving recesses; and
         an axle formed on and protruding from the driving segment at a side opposite to the connecting segment;
      multiple planet gears mounted rotatably and slidably in the receiving recesses respectively and selectively limited by the curved flanges respectively to rotate with the gear base, and each planet gear having a toothed segment and a gear axle; and
      a transmission wheel rotatably combined with the gear base, enclosing the planet gears and having
         a wheel base having a toothed recess defined in a side of the wheel base and having a toothed inner surface selectively engaging the planet gears;
         a transmission gear formed on the wheel base at a side opposite to the toothed recess; and a through hole defined through a center of the transmission gear and communicating with the toothed recess, wherein the axle of the gear base extends rotatably through the toothed recess and the through hole; and a damping assembly connected with the unidirectional transmission device and comprising
 a driven gear engaging the transmission gear on the transmission wheel; and
 a damper connected with the driven gear.

2. The roll control device as claimed in claim 1, wherein
each receiving recess is stepped and comprises a first holding segment and a second holding segment, wherein the second holding segment has an inner diameter larger than that of the first holding segment;
the first holding segment and the second holding segment of each receiving recess respectively have a curved inner surface;
each planet gear comprises
 a gear axle mounted in the first holding segment of a corresponding one of the receiving recesses and slidably abut with the curved inner surface of the first holding segment of the corresponding receiving recess; and
 a toothed segment mounted in the second holding segment of the corresponding receiving recess and having a gap defined between the toothed segment and the curved inner surface of the second holding segment of the corresponding receiving recess.

3. The roll control device as claimed in claim 1, wherein the damping assembly further comprises a central axle; and
 the damper is mounted around the central axle.

4. The roll control device as claimed in claim 3, wherein the driven gear has a diameter larger than that of the transmission gear on the transmission wheel.

5. The roll control device as claimed in claim 4, wherein the gear base further has an engaging hole formed in a side of the connecting segment opposite to the driving segment.

6. The roll control device as claimed in claim 2, wherein the damping assembly further comprises a central axle; and
 the damper is mounted around the central axle.

7. The roll control device as claimed in claim 6, wherein the driven gear has a diameter larger than that of the transmission gear on the transmission wheel.

8. The roll control device as claimed in claim 7, wherein the gear base further has an engaging hole formed in a side of the connecting segment opposite to the driving segment.

9. The roll control device as claimed in claim 1, wherein the driven gear has a diameter larger than that of the transmission gear on the transmission wheel.

10. The roll control device as claimed in claim 9, wherein the gear base further has an engaging hole formed in a side of the connecting segment opposite to the driving segment.

11. The roll control device as claimed in claim 1, wherein the gear base further has an engaging hole formed in a side of the connecting segment opposite to the driving segment.

\* \* \* \* \*